(12) United States Patent
Thomas et al.

(10) Patent No.: US 11,835,762 B2
(45) Date of Patent: Dec. 5, 2023

(54) HIGHER ORDER MODE FILTER

(71) Applicant: ROCKLEY PHOTONICS LIMITED, Altrincham (GB)

(72) Inventors: Abu Thomas, Oak Park, CA (US); Andrea Trita, Pasadena, CA (US); Jeffrey Driscoll, San Jose, CA (US)

(73) Assignee: Rockley Photonics Limited, Altrincham (GB)

( * ) Notice: Subject to any disclaimer, the term of this patent is extended or adjusted under 35 U.S.C. 154(b) by 0 days.

(21) Appl. No.: 17/687,144

(22) Filed: Mar. 4, 2022

(65) Prior Publication Data

US 2022/0283367 A1    Sep. 8, 2022

Related U.S. Application Data

(60) Provisional application No. 63/157,346, filed on Mar. 5, 2021.

(51) Int. Cl.
*G02B 6/125* (2006.01)
*G02B 6/12* (2006.01)

(52) U.S. Cl.
CPC .... *G02B 6/125* (2013.01); *G02B 2006/12109* (2013.01)

(58) Field of Classification Search
None
See application file for complete search history.

(56) References Cited

U.S. PATENT DOCUMENTS

| | | |
|---|---|---|
| 4,786,131 A | 11/1988 | Mahapatra et al. |
| 5,212,758 A | 5/1993 | Adar et al. |
| 5,838,844 A | 11/1998 | Van Dam et al. |
| 6,212,323 B1 | 4/2001 | Harpin et al. |
| 6,516,120 B2 | 2/2003 | Roberts et al. |
| 8,045,834 B2 | 10/2011 | Painter et al. |
| 8,094,987 B2 | 1/2012 | Martin Armani |
| 8,620,120 B2 | 12/2013 | Baets et al. |
| 9,075,251 B2 | 7/2015 | Dwivedi et al. |
| 9,606,293 B2 | 3/2017 | Ma |
| 9,690,045 B2 | 6/2017 | Goodwill et al. |

(Continued)

FOREIGN PATENT DOCUMENTS

| | | |
|---|---|---|
| CN | 104781708 A | 7/2015 |
| EP | 0 645 649 A2 | 3/1995 |

(Continued)

OTHER PUBLICATIONS

Baets, R. et al., "Loss calculation and design of arbitrarily curved integrated-optic waveguides", Optical Society of America, Feb. 1983, pp. 177-182, vol. 73, No. 2.

(Continued)

*Primary Examiner* — Chad H Smith
(74) *Attorney, Agent, or Firm* — Lewis Roca Rothgerber Christie LLP

(57) ABSTRACT

A waveguide mode filter. In some embodiments, the waveguide mode filter includes a first section of waveguide. The first section may have: a first end; a second end; a rate of change of curvature having a magnitude not exceeding 15/mm$^2$ within the first section; a curvature having a magnitude of at most 0.03/mm at the first end; and a curvature having a magnitude of at least 0.1/mm at the second end.

20 Claims, 4 Drawing Sheets

(56) References Cited

U.S. PATENT DOCUMENTS

| | | | |
|---|---|---|---|
| 9,696,478 | B2 | 7/2017 | Bogaerts |
| 9,778,417 | B2 | 10/2017 | Cherchi et al. |
| 10,838,146 | B2 | 11/2020 | Trita |
| 2009/0285542 | A1 | 11/2009 | Martin Armani et al. |
| 2011/0116735 | A1 | 5/2011 | Baets et al. |
| 2011/0138860 | A1 | 6/2011 | Martin Armani |
| 2014/0161384 | A1 | 6/2014 | Dwivedi et al. |
| 2015/0260916 | A1 | 9/2015 | Cherchi et al. |
| 2015/0277042 | A1 | 10/2015 | Goodwill et al. |
| 2016/0025931 | A1 | 1/2016 | Bogaerts |
| 2017/0071510 | A1 | 3/2017 | Delbeke et al. |
| 2017/0205578 | A1 | 7/2017 | Van Thourhout et al. |
| 2017/0299902 | A1 | 10/2017 | Yu et al. |
| 2017/0351025 | A1 | 12/2017 | Trita |
| 2018/0224603 | A1* | 8/2018 | Trita ................ G02B 6/12011 |

FOREIGN PATENT DOCUMENTS

| | | |
|---|---|---|
| EP | 1 464 997 A1 | 10/2004 |
| GB | 2 378 260 A | 2/2003 |
| JP | 11-64654 A | 3/1999 |
| JP | 2006-78570 A | 3/2006 |
| JP | 2006-091679 A | 4/2006 |
| WO | WO 02/14915 A2 | 2/2002 |
| WO | WO 02/14918 A1 | 2/2002 |
| WO | WO 03/048826 A2 | 6/2003 |
| WO | WO 2014/060648 A1 | 4/2014 |
| WO | WO 2018/146221 A1 | 8/2018 |

OTHER PUBLICATIONS

Bauters, J. F. et al., "Ultra-low-loss high-aspect-ratio $Si_3N_4$ waveguides", Optics Express, Feb. 3, 2011, pp. 3163-3174, vol. 19, No. 4, Optical Society of America.

Berlatzky, Y. et al., "Controlling Coupling of Guided to Radiating Modes Using Adiabatic Transitions Between Waveguides of Different Curvature", Journal of Lightwave Technology, Mar. 2005, pp. 1278-1283, vol. 23, No. 3, IEEE.

Bogaerts, W. et al., "Compact Single-Mode Silicon Hybrid Rib/Strip Waveguide With Adiabatic Bends", IEEE Photonics Journal, Jun. 2011, 13 pages, vol. 3, No. 3, IEEE.

Charles, N. et al., "Design of Optically Path Length Matched, Three-Dimensional Photonic Circuits Comprising Uniquely Routed Waveguides", Appl. Opt., 2012, pp. 1-11.

Charles, N. et al., "Techniques for Designing Physically Path-Length Matched Optical Circuitry", IQEC/CLEO Pacific Rim 2011, Aug. 28, 2011 through Sep. 1, 2011, Sydney, Australia, pp. 73-75, AOS.

Cherchi, M. et al., "Dramatic size reduction of waveguide bends on a micron-scale silicon photonic platform", Optics Express, Jul. 29, 2013, pp. 17814-17823, vol. 21, No. 15, Optical Society of America.

Chinese Notification of the First Office Action, for Patent Application No. CN201780034439.8, dated Apr. 26, 2020, 10 pages.

Feng, D. et al., "Compact single-chip VMUX/DEMUX on the silicon-on-insulator platform", Optics Express, Mar. 28, 2011, pp. 6125-6130, vol. 19, No. 7, Optical Society of America.

International Search Report and Written Opinion of the International Searching Authority, dated Oct. 16, 2017, Corresponding to PCT/GB2017/051470, 25 pages.

Invitation to Pay Additional Fees and Partial Search Report dated Aug. 21, 2017, Corresponding to International Application No. PCT/GB2017/051470; 17 pages.

Ismail, N. et al., "Improved arrayed-waveguide-grating layout avoiding systematic phase errors", Optics Express, Apr. 20, 2011, pp. 8781-8794, vol. 19, No. 9, Optical Society of America.

Kim, W.-C. et al., "Investigation of 18-channel CWDM arrayed waveguide grating with silica-based waveguide", Optical Engineering, Aug. 24, 2016, pp. 087110-1 through 087110-6, vol. 55, No. 8, SPIE.

Koos, C. et al., "Ideal Bend Contour Trajectories for Single-Mode Operation of Low-Loss Overmoded Waveguides", IEEE Photonics Technology Letters, Jun. 1, 2007, vol. 19, No. 11, pp. 819-821, IEEE.

Muneeb, M. et al., "Silicon-on-insulator shortwave infrared wavelength meter with integrated photodiodes for on-chip laser monitoring", Optics Express, Oct. 27, 2014, pp. 27300-27308, vol. 22, No. 22, Optical Society of America.

Mustieles, F. J. et al., "Theoretical S-Bend Profile for Optimization of Optical Waveguide Radiation Losses", IEEE Photonics Technology Letters, May 1993, pp. 551-553, vol. 5, No. 5, IEEE.

O'Brien, J. F., "CS 294-13 Advanced Computer Graphics Subdivision Basics", University of California, Natural Splines, Nov. 12, 2009, 34 pages, available at: https://inst.eecs.berkeley.edu/~cs294-13/fa09/lectures/294-lecture17.pdf.

Okamoto, K., "Wavelength-Division-Multiplexing Devices in Thin SOI: Advances and Prospects", IEEE Journal of Selected Topics in Quantum Electronics, Jan. 10, 2014, 10 pages, vol. 20, No. 4, IEEE.

Partial English translation of Chinese Notification of the First Office Action, for Patent Application No. CN201780034439.8, dated Apr. 26, 2020, 8 pages.

Pathak, S. et al., "Comparison of AWGs and Echelle Gratings for Wavelength Division Multiplexing on Silicon-on-Insulator", IEEE Photonics Journal, Oct. 15, 2014, 10 pages, vol. 6, No. 5, IEEE.

Pathak, S., "Silicon Nano-Photonics Based Arrayed Waveguide Gratings", IMEC, Mar. 2014, 75 pages.

Rickman, A., "The commercialization of silicon photonics", Nature Photonics, Aug. 2014, pp. 579-582, vol. 8, Macmillan Publishers Limited.

Sheehan, R. N. et al., "The design of low-loss curved waveguides", Optical and Quantum Electronics, Aug. 21, 2009, pp. 1211-1218, vol. 40, Springer Science+Business Media, LLC.

Sheng, K. J., "Design, Fabrication and Experimental Characterization of a PDMS-Based AWG Spectrometer", Thesis submitted to the Nanyang Technological University in fulfillment of the requirement for the degree of Doctor of Philosophy, 2011, 183 pages.

Soref, R. A. et al., "Large Single-Mode Rib Waveguides in GeSi—Si and Si-on-$SiO_2$", IEEE Journal of Quantum Electronics, Aug. 1991, pp. 1971-1974, vol. 27, No. 8, IEEE.

Takahashi, H. et al., "Wavelength Multiplexer Based on $SiO_2$—$Ta_2O_5$ Arrayed-Waveguide Grating", Journal of Lightwave Technology, pp. 989-995, Jun. 1994, vol. 12, No. 6, IEEE.

Trita, A. et al., "Miniaturized Fiber Bragg Grating Interrogator based on an Arrayed Waveguide Grating in SOI platform", Frontiers in Optics/Laser Science, paper FTh3E.6, 2015, 2 pages, Optical Society of America.

Tu, X. et al., "Compact low-loss adiabatic bends in silicon shallow-etched waveguides", 2016 IEEE 13$^{th}$ International Conference on Group IV Photonics (GFP), Shanghai, 2016, pp. 48-49, IEEE.

U.K. Intellectual Property Office Examination Report, dated Aug. 30, 2018, for Patent Application No. GB1812302.6, 2 pages.

U.K. Intellectual Property Office Examination Report, dated Aug. 13, 2020, for Patent Application No. GB 1812302.6, 2 pages.

U.K. Intellectual Property Office Examination Report, dated Feb. 15, 2019, for Patent Application No. GB1812302.6, 7 pages.

U.K. Intellectual Property Office Examination Report, dated Feb. 12, 2020, for Patent Application No. GB1812302.6, 4 pages.

U.S. Advisory Action from U.S. Appl. No. 15/489,669, dated Dec. 16, 2019, 10 pages.

U.S. Examiner Interview Summary from U.S. Appl. No. 15/489,669, dated May 24, 2018, 4 pages.

U.S. Corrected to Notice of References Cited from U.S. Appl. No. 15/489,669, dated Oct. 22, 2020, 3 pages.

U.S. Office Action from U.S. Appl. No. 15/489,669, dated Jan. 11, 2018, 14 pages.

U.S. Office Action from U.S. Appl. No. 15/489,669, dated Aug. 7, 2018, 16 pages.

U.S. Office Action from U.S. Appl. No. 15/489,669, dated Jan. 7, 2019, 18 pages.

U.S. Office Action from U.S. Appl. No. 15/489,669, dated Jul. 26, 2019, 19 pages.

U.S. Office Action from U.S. Appl. No. 15/489,669, dated Oct. 6, 2017, 7 pages.

(56) References Cited

OTHER PUBLICATIONS

Watts, M. R., "Adiabatic microring resonators", Optics Letters, Oct. 1, 2010, pp. 3231-3233, vol. 35, No. 19, Optical Society of America.
Zhou, X. et al., "Application of Physical Spline Finite Element Method (PSFEM) to Fullwave Analysis of Waveguides", Progress in Electromagnetics Research, 2006, pp. 19-41, vol. 60, Arizona State University, available at: http://www.jpier.org/PIER/pier.php?paper=0508112.
Pathak, Shibnath, "Silicon Nano-Photonics Based Arrayed Waveguide Gratings", University of Gwent, Jan. 2014, 234 pages.
International Search Report and Written Opinion of the International Searching Authority, dated May 19, 2022, corresponding to PCT/EP2022/055487, 16 pages.
Bahadori, M. et al., "Universal Design of Waveguide Bends in Silicon-on-Insulator Photonics Platform", Journal of Lightwave Technology, Apr. 9, 2019, pp. 3044-3054, vol. 37, No. 13, IEEE.
Vogelbacher, F. et al., "Analysis of silicon nitride partial Euler waveguide bends", arXiv.org, Cornell University Library, arXiv:1910.07257v1, Oct. 16, 2019, 13 pages, Optical Society of America.

\* cited by examiner

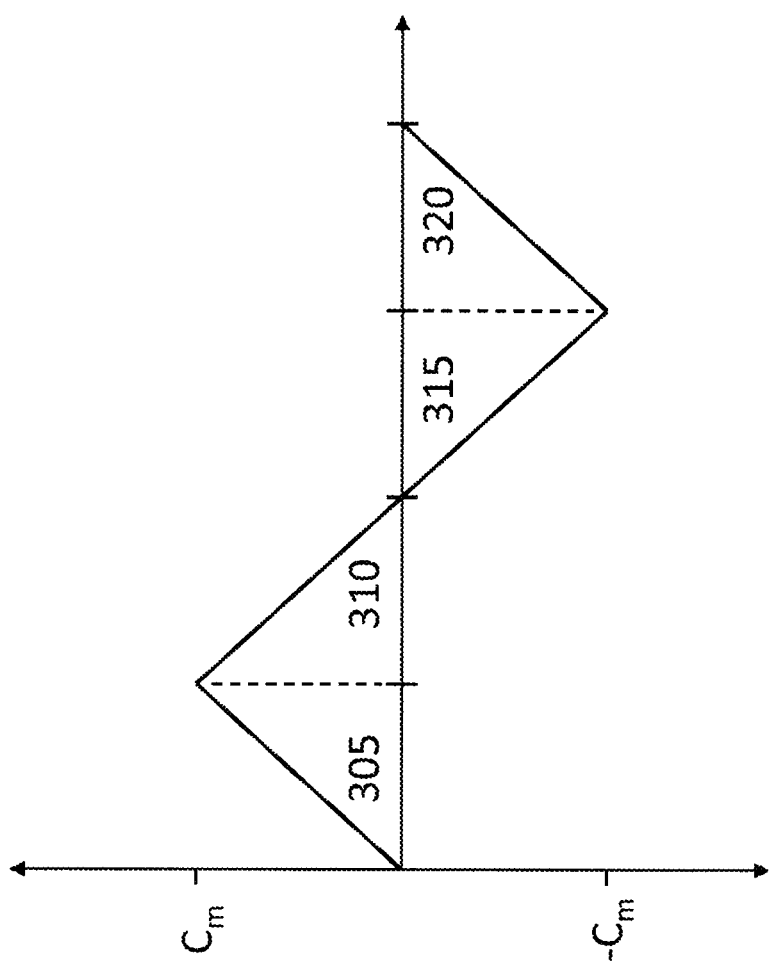

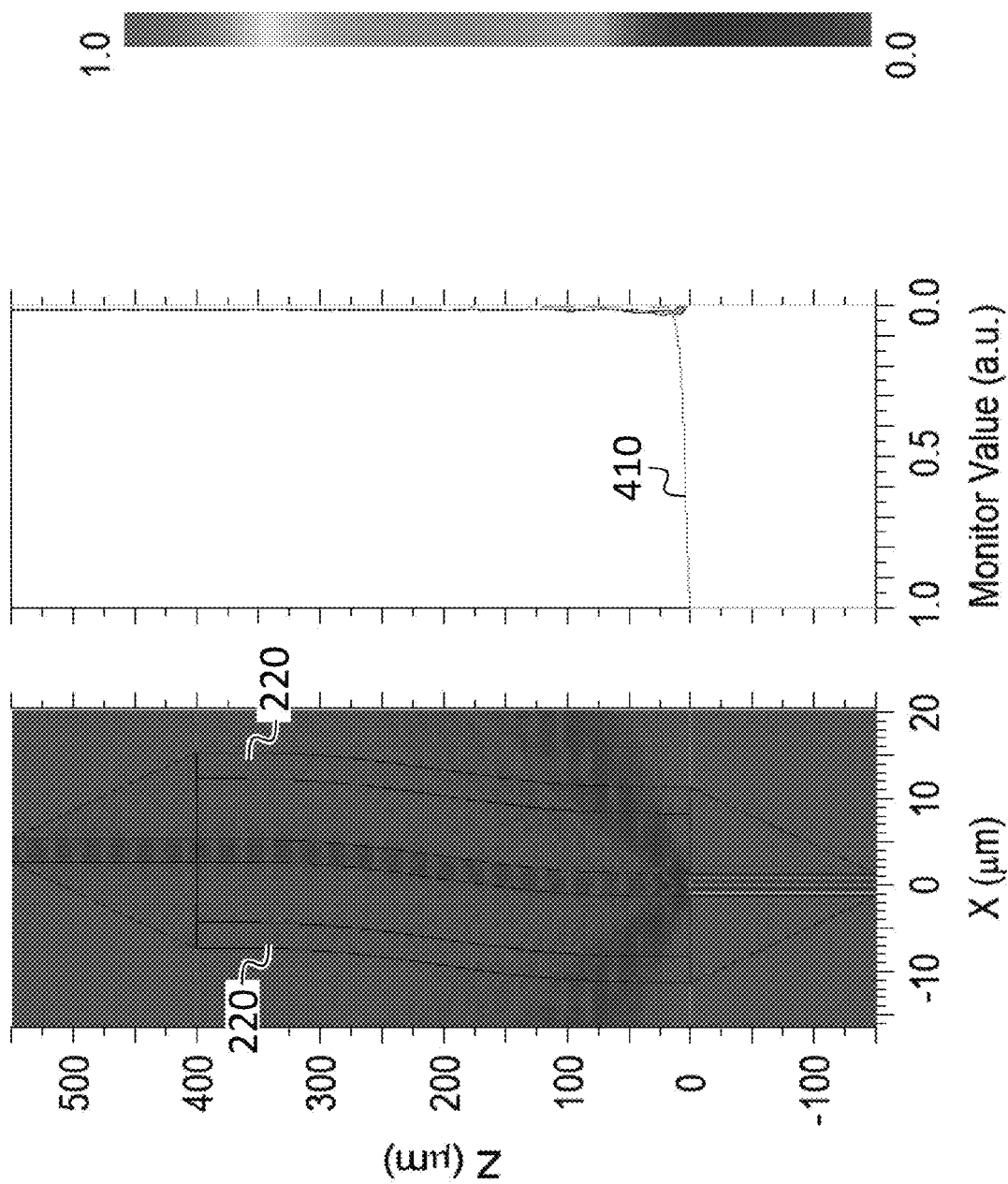
FIG. 4A
FIG. 4B
FIG. 4C

HIGHER ORDER MODE FILTER

CROSS-REFERENCE TO RELATED APPLICATION(S)

The present application claims priority to and the benefit of U.S. Provisional Application No. 63/157,346, filed Mar. 5, 2021, entitled "HIGHER ORDER MODE FILTER", the entire content of which is incorporated herein by reference.

FIELD

One or more aspects of embodiments according to the present disclosure relate to photonic integrated circuits, and more particularly to a higher order mode filter in a photonic integrated circuit.

BACKGROUND

In a photonic integrated circuit, it may be advantageous to employ one or more higher order mode filters to suppress higher order modes in optical waveguides, because the presence of such higher order modes may degrade the performance of the photonic integrated circuit. Moreover, it may be advantageous for a higher order mode filter to be relatively compact.

It is with respect to this general technical environment that aspects of the present disclosure are related.

SUMMARY

According to an embodiment of the present disclosure, there is provided a waveguide mode filter, including: a first section of waveguide, the first section having: a first end; a second end; a rate of change of curvature having a magnitude not exceeding 15/mm² within the first section; a curvature having a magnitude of at most 0.03/mm at the first end; and a curvature having a magnitude of at least 0.1/mm at the second end.

In some embodiments, the curvature of the first section is, at each point on the first section, within 1/mm of a linear function of distance along the length of the first section.

In some embodiments, each point of a centerline of the first section is within 5 microns of a curve defined by a set of points, each point having, for a value of a parameter L: an x coordinate equal to a product of a constant of proportionality and the integral, over a first variable of integration ranging from zero to L, of the cosine of the square of the first variable of integration, and a y coordinate equal to a product of the constant of proportionality and the integral, over a second variable of integration ranging from zero to L, of the sine of the square of the second variable of integration.

In some embodiments, the waveguide mode filter includes a doped region on one side of the first section of waveguide.

In some embodiments, the first section has a length less than 200 microns.

In some embodiments, the first section attenuates a fundamental transverse mode by at most 0.5 dB.

In some embodiments, the first section attenuates a higher order transverse mode by at least 3 dB.

In some embodiments, the magnitude of the curvature of the waveguide, at the first end of the first section, is less than 0.01/mm.

In some embodiments, the waveguide mode filter includes: a second section of waveguide, the second section having: a first end abutting the second end of the first section, and a second end; a third section of waveguide, the third section having: a first end abutting the second end of the second section, and a second end; and a fourth section of waveguide, the fourth section having: a first end abutting the second end of the third section, and a second end; wherein: the first end of the second section has a curvature equal to the curvature at the second end of the first section; the second end of the second section has a curvature having a magnitude less than 0.01/mm; the second end of the third section has a curvature having a magnitude of at least 0.1/mm; and the first end of the fourth section has a curvature having a magnitude of at least 0.1/mm.

In some embodiments, the magnitude of the curvature of the fourth section, at the second end of the fourth section, is less than 0.01/mm.

In some embodiments, the waveguide, at the second end of the fourth section, is parallel, to within 0.5 degrees, to the waveguide, at the first end of the first section.

In some embodiments, an angle between the waveguide, at the second end of the second section, and the waveguide, at the first end of the first section, is greater than 0.5 degrees and less than 2 degrees.

In some embodiments, at each of a set of four points within the first section, the second section, the third section, and the fourth section, respectively, the rate of change of curvature is greater than 1/mm².

In some embodiments, a fifth section of waveguide, consisting of the first section, the second section, the third section, and the fourth section, has a length of less than 600 microns.

In some embodiments, everywhere within the fifth section the rate of change of curvature is less than 15/mm².

In some embodiments, the fifth section of waveguide attenuates a fundamental transverse mode by at most 1 dB.

In some embodiments, the fifth section of waveguide attenuates a higher order transverse mode by at least 10 dB.

In some embodiments, the waveguide mode filter includes a doped region on one side of the fifth section of waveguide.

BRIEF DESCRIPTION OF THE DRAWINGS

These and other features and advantages of the present disclosure will be appreciated and understood with reference to the specification, claims, and appended drawings wherein:

FIG. 3 is a graph of curvature as a function of distance along a waveguide, according to an embodiment of the present disclosure;

FIG. 4A is a graphical output of a simulation, according to an embodiment of the present disclosure;

FIG. 4B is a graphical output of a simulation, according to an embodiment of the present disclosure; and FIG. 4C is a graphical output of a simulation, according to an embodiment of the present disclosure.

DETAILED DESCRIPTION

The detailed description set forth below in connection with the appended drawings is intended as a description of exemplary embodiments of a higher order mode filter provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In a photonic integrated circuit (PIC) (e.g., in a silicon PIC), waveguides may be used to confine and guide light propagating in the PIC. Such a waveguide may be capable of confining a plurality of different transverse modes (each in two different polarization states), including a fundamental mode, and a plurality of higher order modes. In some circumstances the presence of higher order modes may degrade the performance of the PIC; for example, interference between a higher order mode and the fundamental mode may alter the behavior of the PIC, causing a reduction in performance.

Figure 1:
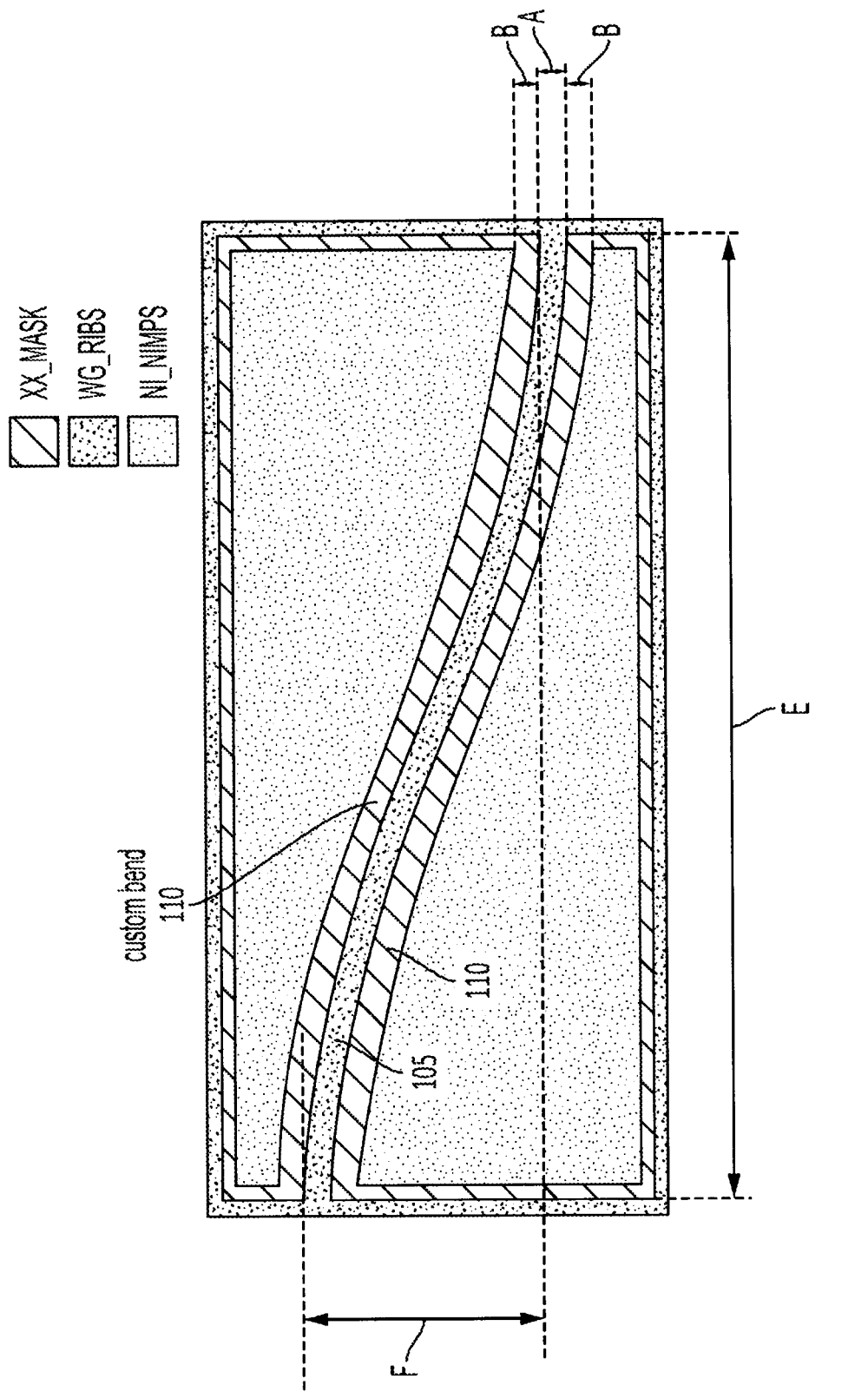
FIG. 1 is a schematic top view of a higher order mode filter, according to an embodiment of the present disclosure.

As such, it may be advantageous to filter out higher order modes, e.g., using a higher order mode filter. FIG. 1 shows a higher order mode filter, in some embodiments. The higher order mode filter may include a section of waveguide including one or more curved sections, in which the radius of curvature may be, e.g., between 1 mm and 10 mm. As used herein, a "section" of waveguide is a length of waveguide; as such a first section of waveguide may in turn include a plurality of sections, each of which is a portion of the first section of waveguide, along the length of the first section of waveguide. As used herein, if a first section of waveguide is described as "abutting" a second section of waveguide, it means that the second section begins where the first section ends; there may or may not be a physical feature (e.g., a change in the rate of change of curvature) at the point at which the two sections abut against each other.

The curved section may allow optical power propagating in higher order modes to escape from the waveguide at significantly higher rates than the fundamental mode, so that if at one end of the higher order mode filter light propagating in a first superposition of modes is launched into the waveguide of the higher order mode filter, then the light exiting the higher order mode filter at the other end of the waveguide may carry a second superposition of modes, in which a greater proportion of the optical power is in the fundamental mode than in the first superposition of modes. In some embodiments, the higher order mode filter may attenuate each higher order mode by at least 10 dB (e.g., by an attenuation between 10 dB and 100 dB) and it may attenuate the fundamental mode by as little as 0.02 dB (e.g., by between 0.02 dB and 2 dB).

As illustrated in FIG. 1, the higher order mode filter may include a curved section of waveguide 105. The waveguide may be a rib waveguide, fabricated on a silicon on insulator (SOI) wafer. The silicon on insulator wafer may include a substrate, an oxide layer (or buried oxide, or "BOX" layer), on the substrate, and a device layer (e.g., a 3-micron thick device layer) of silicon (e.g., of crystalline silicon) on the BOX layer. The rib waveguide may be between two slabs 110 having a height of 1.8 microns (above the BOX layer) (e.g., a thickness of 1.8 microns) and may have a width of about 2.6 microns (e.g., a width between 1.5 microns and 4 microns) and it may extend about 1.2 microns above the slabs (so that the total height of the rib 105 may be the same as the thickness of the device layer). In the terminology used herein, the "waveguide" is the rib, and the slabs are not considered part of the "waveguide", although a significant fraction of the optical power may propagate within the slab. The rib waveguide may be formed by masking the rib and etching a trench on each side of the rib, the trench having a depth of about 1.2 microns. The remainder of the device layer at the bottom of the trenches (e.g., the remaining 1.8 microns of device layer) may form the slabs 110.

Figure 2:
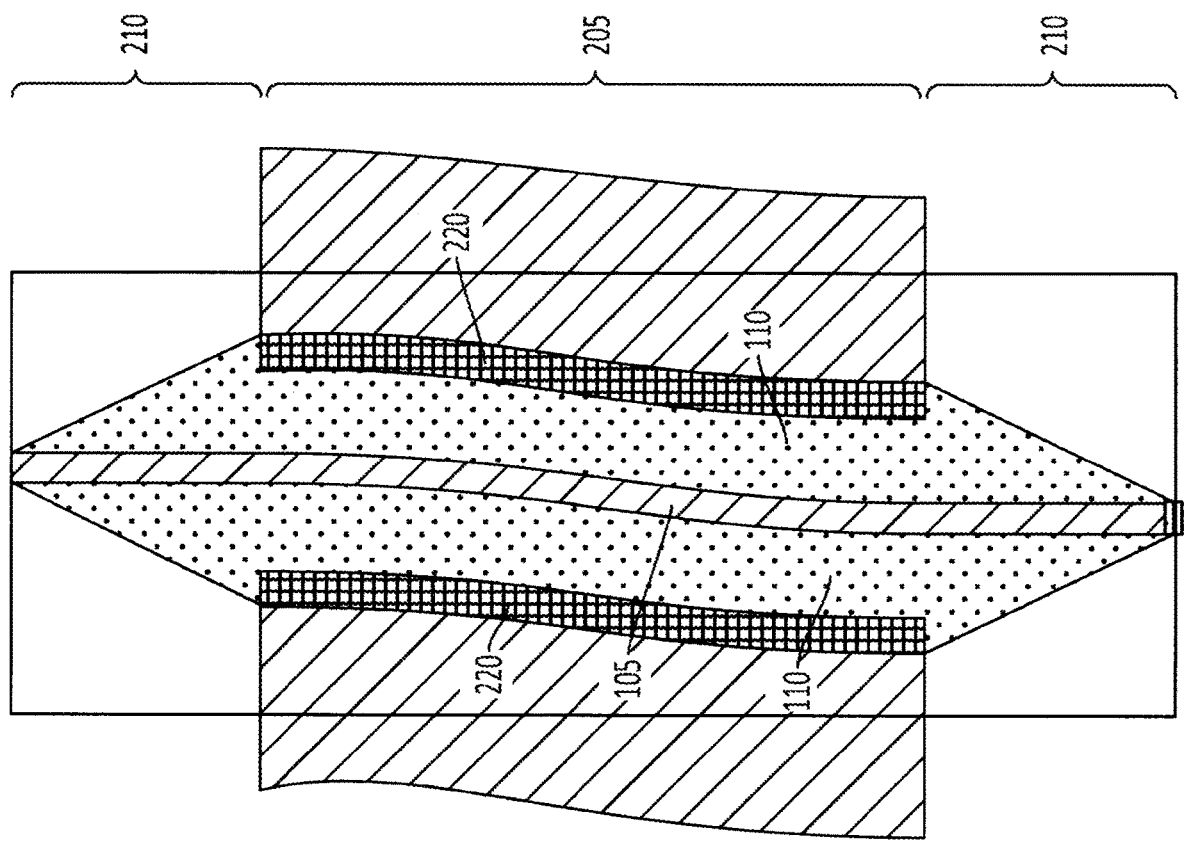
FIG. 2 is a top view of a higher order mode filter, according to an embodiment of the present disclosure.

The waveguide may have the shape of an S-bend, as shown in FIG. 1 and in FIG. 2, i.e., it may include, for light propagating from a first end of the higher order mode filter to a second end of the higher order mode filter, a first bend within which the waveguide bends in a clockwise direction (as viewed from the top of the PIC) and a second bend within which the waveguide bends in a counterclockwise direction. A higher order mode filter may be constructed using circular arcs for the first bend and the second bend. The performance of such a higher order mode filter may be limited, however, by abrupt changes in curvature at the ends of the higher order mode filter and at the transition between the clockwise bend and the counterclockwise bend; such abrupt changes in curvature may result in loss of optical power from the fundamental mode, and significant coupling between modes, e.g., coupling of power from the fundamental mode to higher order modes. As used herein, the "curvature" of a waveguide at any point is the reciprocal of the radius of curvature at that point.

As such, in some embodiments, the waveguide is constructed such that changes in the curvature of the waveguide along its length occur gradually, e.g., the rate of change of curvature may be finite along the length of the waveguide. In some embodiments, the waveguide is constructed such that the magnitude of the rate of change of curvature does not exceed a certain maximum value, e.g., $3/\text{mm}^2$ (e.g., a maximum rate of change of curvature between $1/\text{mm}^2$ and $15/\text{mm}^2$).

FIG. 2 shows a higher order mode filter 205 including two bends each of which is composed of two sections within each of which the curvature of the waveguide changes linearly, at a constant rate of change. Also shown in FIG. 2 are two straight waveguide sections 210 used to launch light (e.g., in a simulation) into a first end of the higher order mode filter 205 (the first end being, for example, the input, and being at the bottom, in the orientation of FIG. 2) and to receive the filtered light at a second end of the higher order mode filter 205 (the second end being, for example, the output, at the top of FIG. 2). FIG. 2 is drawn to scale, for one embodiment.

The angle of the direction change within the first bend (which is about 1.1 degrees (or within 50% of 1.1 degrees) in the embodiment of FIG. 2) may be the same as the angle of the direction change within the second bend, so that the waveguide at the second end is parallel to, and laterally offset from, the waveguide at the first end. The angle of the direction change within the first bend may be the same as the angle of the direction change within the second bend, so that the waveguide at the second end is substantially parallel to (e.g., within 0.5 degrees of being parallel to), and laterally offset from, the waveguide at the first end. In some embodiments the length of the higher order mode filter (dimension E in FIG. 1) and the offset between the waveguides at the two ends (dimension F in FIG. 1) are (or are within 50% of) 400 microns and 4.1 microns, respectively.

FIG. 3 shows curvature as a function of length along the waveguide, for the higher order mode filter 205 of FIG. 2. In FIG. 3, positive curvature is clockwise curvature for light propagating from the bottom of the higher order mode filter 205, to the top of the higher order mode filter 205, in the orientation of FIG. 2, and the left edge of FIG. 3 corresponds to the bottom end of the waveguide. The curvature (i) increases linearly (at a constant rate of change), in a first section 305, from zero to a maximum curvature $C_m$, then (ii) decreases at a constant rate of change, in a second section 310, to zero, then (iii) continues to decrease at the same constant rate of change, in a third section 315, to a minimum value of $-C_m$ and then (iv) increases again to zero, in a fourth section 320, at the same constant rate of change as in the first section 305. Within the first two sections 305, 310, the curvature is positive (e.g., clockwise) and within the third and fourth sections 315, 320, the curvature is negative (e.g., counterclockwise). The waveguide of the higher order mode filter 205 has zero curvature at both ends (i.e., at the input and at the output) and may therefore be inserted between two straight sections of waveguide (suitably offset from each other) without there being a discontinuity in curvature at the input or at the output. In some embodiments, the maximum curvature $C_m$ is between 0.1/mm and 1/mm, and the magnitude of the rate of change of curvature within each of the sections 305, 310, 315, 320 is between 0.5/mm$^2$ and 12/mm$^2$.

FIG. 4A shows results from a simulation of light propagation in the higher order mode filter 205 of FIG. 2. FIG. 4A is drawn to scale, for one embodiment. In the simulation, light is injected into the input of the higher order mode filter 205. The intensity pattern of the injected light is shown in FIG. 4C; it includes three lobes, separated horizontally. The injected light does not include a component in the fundamental mode. FIG. 4A shows the intensity distribution that results when this light is injected into the input of the higher order mode filter 205. It may be seen that most of the light escapes from the waveguide near the beginning of the higher order mode filter 205. Light that is in the two outer lobes may escape at a high rate even when the curvature of the waveguide is slight (as it is near the beginning of the higher order mode filter 205). Light in the central lobe may escape more slowly, and at a rate depending on the curvature of the waveguide. FIG. 4B shows (in a first curve 410) the power remaining in the waveguide, in a mode corresponding to the intensity pattern of FIG. 4C. The vertical scale of FIG. 4C is the same as that of FIG. 4A. It may be seen that the power in the waveguide drops to nearly zero at a distance of about 20 microns from the beginning of the higher order mode filter. Other curves in FIG. 4B show the power in other modes (these other curves are not readily perceptible in FIG. 4B because of overlap between them and the first curve 410).

References to "input" and "output" are made for ease of description herein. The higher order mode filter 205 of FIG. 2, for example, may be reciprocal device and its characteristics may be analogous for light propagating from the output to the input.

In some embodiments the shape of the waveguide (e.g., of the centerline of the waveguide) of any of the four sections of the higher order mode filter may be calculated using the following integrals:

$$x = \frac{1}{a}\int_0^L \cos(s^2)\, ds$$

$$y = \frac{1}{a}\int_0^L \sin(s^2)\, ds$$

A curve that has (x, y) coordinates given by these two integrals (i.e., (i) an x coordinate equal to a product of a constant of proportionality and the integral, over a first variable of integration (s) ranging from zero to L, of the cosine of the square of the first variable of integration, and (ii) a y coordinate equal to a product of the constant of proportionality and the integral, over a second variable of integration (s) ranging from zero to L, of the sine of the square of the second variable of integration) may be referred to as a "clothoid" curve. A curve having a curvature that varies linearly with length along the curve (as is the case for each of the four sections of the higher order mode filter of FIG. 2) may be referred to as an "Euler" bend or as an "Euler spiral". The Euler bends may be a subset of the clothoid curves. In some embodiments the centerline of the waveguide section may not precisely follow the curve defined by the (x, y) coordinates defined above but it may instead be the case that every point of the centerline is within a certain distance (e.g., within 1 micron or within 5 microns, or within some other distance between 0.1 microns and 10.0 microns) of the curve.

In some embodiments, doped regions 220 (FIG. 2 and FIG. 4A) may be formed in the device layer on both sides of the waveguide of the higher order mode filter to absorb (e.g., by free carrier absorption) the light that propagates in higher order modes at the input to the mode filter and that escapes from the waveguide of the higher order mode filter (as a result of the curvature of this waveguide), and that, if not absorbed, may interfere with the operation of other parts of the photonic integrated circuit. The doped regions may have a doping density of (or within an order of magnitude of) $10^{19}$/cm$^3$ (with either an n-type dopant or a p-type dopant) and be positioned and sized so as to intercept most of the light that escapes from the waveguide; the distribution of this light may be determined using a simulation such as the one that produced the result of FIG. 4A. Each of the doped regions 220 may have a shape and dimensions as illustrated (or within 50% of those illustrated) in FIG. 4A. Each of the doped regions 220 may be separated from the rib (e.g., by at least twice the width of the rib) to avoid significant overlap between the fundamental mode and the doped regions (which, if present, could cause attenuation of the fundamental mode).

In some embodiments, a higher order mode filter may form a right-angled bend instead of an S-bend. Such an embodiment may include two sections of waveguide having the same direction of curvature (e.g., both clockwise or both counterclockwise), and each may contribute 45 degrees of direction change. For example, in the first section, the curvature may increase at a constant rate to a maximum rate of curvature, and the waveguide at the output end of the first section may be at an angle of 45 degrees relative to the input waveguide; in the second section the curvature may decrease at the same constant rate back to zero. By symmetry the waveguide at the output of the second section may then be at an angle of 45 degrees with respect to the waveguide at the input of the second section, and at an angle of 90 degrees with respect to the waveguide at the input of the first section. In another embodiment, the right-angled higher order mode filter may include three sections: (i) a first section in which the curvature increases linearly to the maximum curvature, (ii) a second section within which the curvature is constant and equal to the maximum curvature, and (iii) a third section in which the curvature decreases linearly back to zero.

Waveguides fabricated using photolithography or other fabrication techniques employed to fabricate photonic integrated circuits may have walls with small-scale (e.g., nm-scale) roughness. This roughness may result in each wall of the waveguide having a local curvature, on a small scale, that is relatively large and fluctuates significantly along the length of the waveguide. This local roughness, however, may have relatively little effect on the propagation of light in the waveguide. Accordingly, the curvature of a waveguide (as distinct from the local curvature of a wall of the waveguide) is defined herein as the curvature that would be measured if the small-scale roughness of the waveguide is disregarded. The curvature of a waveguide may be measured, for example, with an optical microscope, which may be insensitive to features (such as waveguide wall roughness) that are significantly smaller than the wavelength of visible light.

As used herein, the "centerline" of a waveguide is a line (e.g., a curved line) each point of which is, in a direction parallel to the plane of the photonic integrated circuit and transverse to the waveguide, in the middle of the waveguide. As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. When a second number is "within Y %" of a first number, it means that the second number is at least (1−Y/100) times the first number and the second number is at most (1+Y/100) times the first number. As used herein, the word "or" is inclusive, so that, for example, "A or B" means any one of (i) A, (ii) B, and (iii) A and B.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items. As used herein, any structure or layer that is described as being "made of" or "composed of" a substance should be understood (i) in some embodiments, to contain that substance as the primary component or (ii) in some embodiments, to contain that substance as the major component.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a higher order mode filter have been specifically described and illustrated herein, many modifications and variations will be apparent to those skilled in the art. Accordingly, it is to be understood that a higher order mode filter constructed according to principles of this disclosure may be embodied other than as specifically described herein. The invention is also defined in the following claims, and equivalents thereof.

What is claimed is:

1. A waveguide mode filter, comprising:
a first section of waveguide, the first section having:
  a first end,
  a second end,
  a rate of change of curvature having a magnitude not exceeding 15/mm$^2$ within the first section,
  a curvature having a magnitude of at most 0.03/mm at the first end, and
  a curvature having a magnitude of at least 0.1/mm at the second end;
a second section of waveguide, the second section having:
  a first end abutting the second end of the first section,
  a second end,
  a curvature having a magnitude of less than 0.01/mm at the second end; and
a third section of waveguide, the third section having:
  a first end abutting the second end of the second section,
  a second end, and
  a curvature having a magnitude of at least 0.1/mm at the second end,
wherein each of the first section, the second section, and the third section has a maximum magnitude of curvature between 0.1/mm and 1/mm.

2. The waveguide mode filter of claim 1, wherein the curvature of the first section is, at each point on the first section, within 1/mm of a linear function of distance along a length of the first section.

3. The waveguide mode filter of claim 1, wherein each point of a centerline of the first section is within 5 microns of a curve defined by a set of points, each point having, for a value of a parameter L:

an x coordinate equal to a product of a constant of proportionality and an integral, over a first variable of integration ranging from zero to L, of the cosine of the square of the first variable of integration, and a y coordinate equal to a product of the constant of proportionality and an integral, over a second variable of integration ranging from zero to L, of the sine of the square of the second variable of integration.

4. The waveguide mode filter of claim 1, comprising a doped region on one side of the first section of waveguide.

5. The waveguide mode filter of claim 1, wherein the first section has a length less than 200 microns.

6. The waveguide mode filter of claim 1, wherein the first section attenuates a fundamental transverse mode by at most 0.5 dB.

7. The waveguide mode filter of claim 1, wherein the first section attenuates a higher order transverse mode by at least 3 dB.

8. The waveguide mode filter of claim 1, wherein the magnitude of the curvature of the waveguide, at the first end of the first section, is less than 0.01/mm.

9. The waveguide mode filter of claim 1, further comprising:
a fourth section of waveguide, the fourth section having:
a first end abutting the second end of the third section, and
a second end;
wherein:
the first end of the second section has a curvature equal to the curvature at the second end of the first section; and
the first end of the fourth section has a curvature having a magnitude of at least 0.1/mm.

10. The waveguide mode filter of claim 9, wherein the magnitude of the curvature of the fourth section, at the second end of the fourth section, is less than 0.01/mm.

11. The waveguide mode filter of claim 10, wherein the waveguide, at the second end of the fourth section, is parallel, to within 0.5 degrees, to the waveguide, at the first end of the first section.

12. The waveguide mode filter of claim 9, wherein an angle between the waveguide, at the second end of the second section, and the waveguide, at the first end of the first section, is greater than 0.5 degrees and less than 2 degrees.

13. The waveguide mode filter of claim 9, wherein, at each of a set of four points within the first section, the second section, the third section, and the fourth section, respectively, the rate of change of curvature is greater than $1/mm^2$.

14. The waveguide mode filter of claim 9, wherein a fifth section of waveguide, consisting of the first section, the second section, the third section, and the fourth section, has a length of less than 600 microns.

15. The waveguide mode filter of claim 14, wherein everywhere within the fifth section the rate of change of curvature is less than $15/mm^2$.

16. The waveguide mode filter of claim 15, wherein the fifth section of waveguide attenuates a fundamental transverse mode by at most 1 dB.

17. The waveguide mode filter of claim 15, wherein the fifth section of waveguide attenuates a higher order transverse mode by at least 10 dB.

18. The waveguide mode filter of claim 14, comprising a doped region on one side of the fifth section of waveguide.

19. A waveguide mode filter, comprising:
a first section of waveguide; and
a doped region on a side of the first section of waveguide, the first section having:
a first end;
a second end;
a rate of change of curvature having a magnitude not exceeding $15/mm^2$ within the first section;
a curvature having a magnitude of at most 0.03/mm at the first end; and
a curvature having a magnitude of at least 0.1/mm at the second end, and
a length of the doped region, measured in a direction parallel to an optical path of the waveguide, being greater than a length of the first section of waveguide.

20. The waveguide mode filter of claim 19, wherein the length of the doped region is at least twice the length of the first section of waveguide.

* * * * *